(12) United States Patent
Ishigami et al.

(10) Patent No.: US 9,347,638 B2
(45) Date of Patent: May 24, 2016

(54) VEHICULAR LAMP

(71) Applicants: Atsushi Ishigami, Shizuoka (JP); Shigehiko Kazaoka, Shizuoka (JP)

(72) Inventors: Atsushi Ishigami, Shizuoka (JP); Shigehiko Kazaoka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 257 days.

(21) Appl. No.: 13/631,065

(22) Filed: Sep. 28, 2012

(65) Prior Publication Data

US 2013/0083550 A1 Apr. 4, 2013

(30) Foreign Application Priority Data

Sep. 30, 2011 (JP) .................. 2011-216610

(51) Int. Cl.
*B60Q 1/00* (2006.01)
*F21S 8/10* (2006.01)
*B60Q 3/02* (2006.01)

(52) U.S. Cl.
CPC .............. *F21S 48/25* (2013.01); *B60Q 3/023* (2013.01); *F21S 48/215* (2013.01); *F21S 48/2206* (2013.01); *F21S 48/2237* (2013.01); *F21S 48/2268* (2013.01); *F21S 48/2287* (2013.01); *F21S 48/255* (2013.01)

(58) Field of Classification Search
CPC ....... F21S 48/1159; F21S 48/13; F21S 48/25; F21S 48/2206
USPC .......... 362/459, 509, 511, 514, 516, 546, 545
See application file for complete search history.

(56) References Cited

U.S. PATENT DOCUMENTS

| | | | |
|---|---|---|---|
| 6,761,461 B2* | 7/2004 | Mizutani et al. | 362/600 |
| 2006/0119751 A1* | 6/2006 | Suehiro et al. | 349/5 |
| 2008/0259624 A1 | 10/2008 | Yajima et al. | |
| 2009/0034282 A1 | 2/2009 | Nakamura et al. | |
| 2009/0154186 A1 | 6/2009 | Natsume et al. | |
| 2010/0053986 A1 | 3/2010 | Ishikawa | |

(Continued)

FOREIGN PATENT DOCUMENTS

| | | |
|---|---|---|
| CN | 1186923 | 7/1998 |
| CN | 101660697 A | 3/2010 |
| CN | 102196944 A | 9/2011 |

(Continued)

OTHER PUBLICATIONS

Chinese Office Action issued Jun. 26, 2014 in Chinese Patent Application No. 201210361287.1.

(Continued)

*Primary Examiner* — Evan Dzierzynski
*Assistant Examiner* — Meghan Ulanday
(74) *Attorney, Agent, or Firm* — Sughrue Mion, PLLC

(57) ABSTRACT

A vehicular lamp includes: a lamp body having an opening portion; an outer cover that closes the opening portion and that, together with the lamp body, forms a lamp chamber between the outer cover and the lamp body; a light emission portion disposed within the lamp chamber; a vapor deposition sheet that is disposed within the lamp chamber and that covers the lamp body with at least a portion of the light emission portion exposed; and an engaging portion that at least one of the outer cover and the lamp body has and that is capable of engaging with the vapor deposition sheet and holding the vapor deposition sheet in a shape that substantially conforms to the outer cover or the lamp body.

9 Claims, 3 Drawing Sheets

(56) References Cited

U.S. PATENT DOCUMENTS

2011/0122650 A1* 5/2011 Osumi et al. .................. 362/606
2011/0235353 A1* 9/2011 Fukasawa ............ B60Q 1/2665
362/494

FOREIGN PATENT DOCUMENTS

| JP | 2001166714 A | 6/2001 |
|---|---|---|
| JP | 2011166714 A | 6/2001 |
| JP | 2008-114677 A | 5/2008 |
| JP | 200954569 A | 3/2009 |
| JP | 2009-146722 A | 7/2009 |
| JP | 2010-52566 A | 3/2010 |
| JP | 2010254056 A | 11/2010 |
| JP | 2011044396 A | 3/2011 |

OTHER PUBLICATIONS

Communication dated Jun. 23, 2015, issued by the Japan Patent Office in corresponding Japanese Application No. 2011-216610.

* cited by examiner

US 9,347,638 B2

VEHICULAR LAMP

INCORPORATION BY REFERENCE

The disclosure of Japanese Patent Application No. 2011-216610 filed on Sep. 30, 2011 including the specification, drawings and abstract is incorporated herein by reference in its entirety.

BACKGROUND OF THE INVENTION

1. Field of the Invention

The present invention relates to a vehicular lamp and, more particularly, to a side turn signal lamp integrated with a side mirror of a vehicle.

2. Description of Related Art

A side turn signal lamp that is mounted integrally with a side mirror of a vehicle and that is used to notify a change of the travel direction of a host vehicle to vehicle drivers, pedestrians, etc. present in sideway or rearward directions has been available as described, for example, in Japanese Patent Application Publication No. 2010-52566 (JP 2010-52566 A) and the like. A side turn signal lamp described in JP 2010-52566 A includes a lamp body, a front surface lens, a light guide inner lens and first and second LEDs. In this side turn signal lamp, an extension reflector extending along the front surface lens is mounted at a front position in the lamp body, and thus shields the first and second LEDs so that the first and second LEDs cannot be directly seen from outside.

In recent years, side mirrors are designed to have various built-in added functions, such as a camera, a sensor, etc., so that size reductions of side turn signal lamps are demanded. According to JP 2010-52566 A, however, the extension reflector is formed of a resin and has large wall thickness, and this construction limits the size reduction of the lamps. Furthermore, in JP 2010-52566 A, it is difficult to uniformly perform a decoration process on an extension reflector that has a complicated shape, and this increases the production cost.

SUMMARY OF THE INVENTION

The present invention provides a small-size and low-cost vehicular lamp that achieves high assembly efficiency.

A vehicular lamp in accordance with an aspect of the present invention includes: a lamp body having an opening portion; an outer cover that closes the opening portion and that, together with the lamp body, forms a lamp chamber between the outer cover and the lamp body; a light emission portion disposed within the lamp chamber; a vapor deposition sheet that is disposed within the lamp chamber and that covers the lamp body with at least a portion of the light emission portion exposed; and an engaging portion that at least one of the outer cover and the lamp body has and that is capable of engaging with the vapor deposition sheet and holding the vapor deposition sheet in a shape that substantially conforms to the outer cover or the lamp body.

The present inventors have considered a technology of using, as an extension, a vapor deposition sheet obtained by performing a metal vapor deposition process on a resin sheet. However, when the vapor deposition sheet is stuck to a lamp body by adhesive or double sided tape, this sticking operation is troublesome, and moreover, it is necessary to use a special adhesive capable of withstanding the high temperature resulting from heat produced by a light source. Therefore, the inventors have conducted vigorous researches and studies regarding reduction of the production cost of a side turn signal lamp or the like and improvement of the efficiency of the assembly thereof, and have accomplished the invention.

According to the vehicular lamp of the present invention, the adoption of a thin vapor deposition sheet makes it possible to reduce the size of the vehicular lamp. Furthermore, since the vapor deposition sheet is held in a state in which the vapor deposition sheet extends along the lamp body or the outer cover, the vapor deposition sheet does not require the fixation via double sided tape. Therefore, a small-size vehicular lamp with high assembly efficiency can be provided at low cost.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment in which the invention is applied to a side turn signal lamp as an example of a vehicular lamp will be described with reference to FIGS. 1 to 5.

Figure 1:
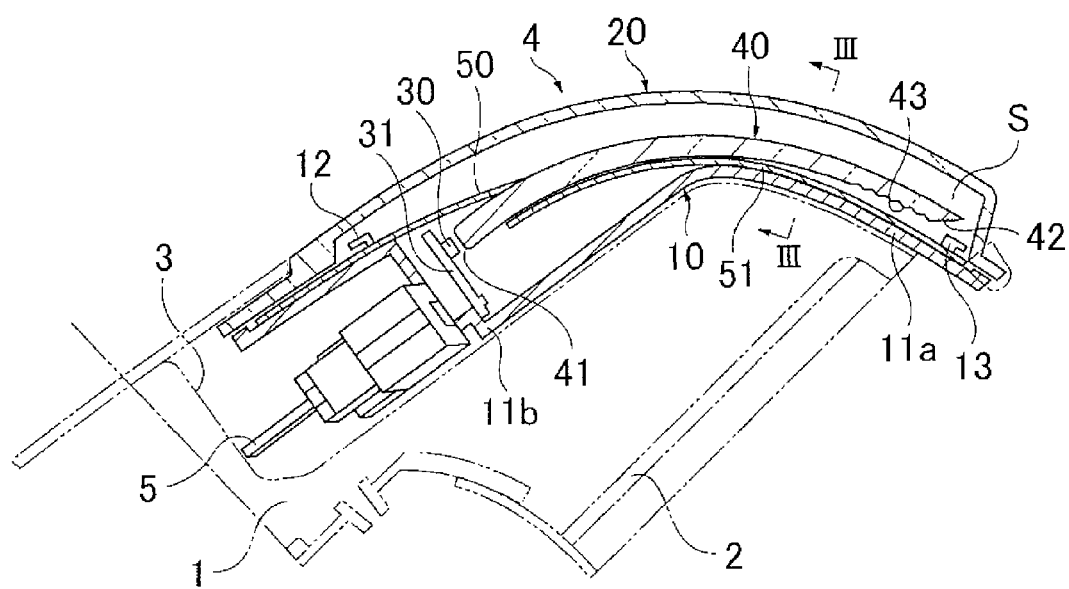
FIG. 1 is a horizontal sectional view of a vehicular lamp showing an embodiment of the present invention.

FIG. 1 is a horizontal sectional view showing a side turn signal lamp 4 in accordance with this embodiment of the invention. As shown in FIG. 1, the side turn signal lamp 4 is mounted in a side mirror of a vehicle so that an integral side mirror unit is formed, as shown in FIG. 1.

A housing 1 that is a component of the side mirror is formed so as to protrude in a curved shape sideways from the vehicle. This housing 1 supports a mirror 2 that faces rearward relative to the vehicle. At a front face of the housing 1, there is formed an opening 3 that extends from the front face toward a side of the housing 1.

The side turn signal lamp 4 is fixed within the opening 3 of the housing 1. The side turn signal lamp 4 includes a lamp body 10 having a shape that substantially conforms to an inner wall of the opening 3 of the housing 1, and an outer cover 20 that is disposed facing the lamp body 10.

The lamp body 10 is an elongated resin member that extends in a curved, shape sideways relative to the vehicle. The lamp body 10 is fixed within the opening 3 of the housing 1. The lamp body 10 has a shape that is open forward. The lamp body 10 is made up of a curved surface portion 11a that is curved along the outer cover 20, and a light source housing portion 11b that is recessed away from the outer cover 20. Furthermore, both ends of the lamp body 10 in the lengthwise direction respectively have first and second engaging projections (engaging portions) 12 and 13 that are projected to the outer cover 20 side and that extend away from each other.

The outer cover 20 is an elongated resin member that is curved similarly to a curved front surface of the housing 1. The outer cover 20 is attached to the lamp body 10 so as to cover an opening portion of the lamp body 10 from the front of the vehicle. As a result, a lamp chamber S is defined between the lamp body 10 and the outer cover 20. An external contour shape of the outer cover 20 is generally the same as the external contour shape of the lamp body 10.

Inside the lamp chamber S, there are provided a light emitting diode (LED) (light source) 30 mounted on a circuit board 31 and an inner lens (light guide) 40 that guides light from the LED 30. The LED 30 and the inner lens 40 form a light emission portion. The circuit board 31 is attached to the light source housing portion 11b of the lamp body 10. The LED 30 is supplied with electric power from the vehicle through electrode terminals 5 that are disposed between the lamp body 10 and the housing 1.

The inner lens 40 is an elongated transparent resin member, and is curved similarly to the outer cover 20. An end of the inner lens 40 is provided with a light entrance surface 41 that faces the LED 30. The other of the inner lens 40 is provided with a light exit surface 42 from which light is sent out rearward relative to the vehicle. Due to this, light from the LED 30 enters the inner lens 40 through the light entrance surface 41, and is guided in the inner lens 40, and is sent out from the light exit surface 42 rearward relative to the vehicle.

In this embodiment, a rear surface of the inner lens 40 in the vicinity of the light exit surface 42 is provided as a reflection portion (optical element) 43 that has a plurality of reflection steps. By this reflection portion 43, part the light arriving after being guided in the inner lens 40 is reflected forward or sideways relative to the vehicle. This construction improves the visibility of the side turn signal lamp 4 from forward and sideways relative to the vehicle.

A flexible thin vapor deposition sheet 50 is provided in the lamp chamber S. This vapor deposition sheet 50 is formed by performing aluminum vapor deposition on a surface of a polycarbonate sheet. The vapor deposition sheet 50 covers the lamp body 10 so as to shield the lamp body 10, the LED 30 and a portion of the inner lens 40 from outside.

Figure 2:
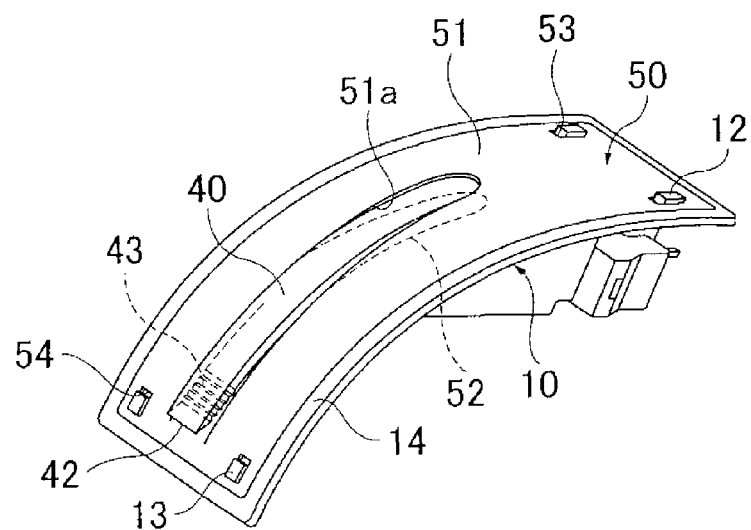
FIG. 2 is an enlarged view of important portions of the vehicular lamp shown in FIG. 1.

FIG. 2 is a perspective view showing the side turn signal lamp 4 in a state in which the outer cover 20 has been removed. As shown in FIG. 2, a substantially center portion of the vapor deposition sheet 50 has an insertion hole (insertion opening portion) 51a. A portion of the inner lens 40 that includes the light exit surface 42 is exposed to the outside through the insertion hole 51a.

The vapor deposition sheet 50 includes a sheet body 51 that is provided with the insertion hole 51a, and an insert portion 52 that has a shape that corresponds to that of the insertion hole 51a. The insertion hole 51a is formed by making a narrow elongated U-shaped cut in the sheet body 51, and the narrow elongated portion inside the cut forms the insert portion 52 (see FIG. 4). Therefore, an end of the insert portion 52 (at the light exit surface 42 side of the inner lens 40) connects to the sheet body 51, that is, the sheet body 51 and the insert portion 52 are portions of one integral member.

Furthermore, first engagement holes 53 and second engagement holes 54 are provided near two ends of the vapor deposition sheet 50 in its lengthwise direction. The first and second engagement holes 53 and 54 are disposed at such positions as to be able to engage with the first and second engaging projections 12 and 13, respectively, of the lamp body 10.

The insert portion 52 is inserted from the light exit surface 42 side of the inner lens 40 to the back side of the inner lens 40, and faces the reflection portion 43 of the inner lens 40. Due to this, the insert portion 52 hides the lamp body 10 so that the lamp body 10 is not directly visible from outside through the inner lens 40. Furthermore, the insert portion 52 reflects light that leaks to the lamp body 10 side from the reflection portion 43 of the inner lens 40. This increases the light use efficiency of the side turn signal lamp 4, and causes the lamp 4 to glow brighter.

Furthermore, as shown in FIG. 2, an outer peripheral edge of the lamp body 10 is provided with a frame-shaped stepped portion 14 that is protruded to the outer cover 20 side. The vapor deposition sheet 50 is disposed inside the frame-shaped stepped portion 14. Furthermore, the protrusion height of the stepped portion 14 is substantially equal to the thickness of the vapor deposition sheet 50.

Figure 3:
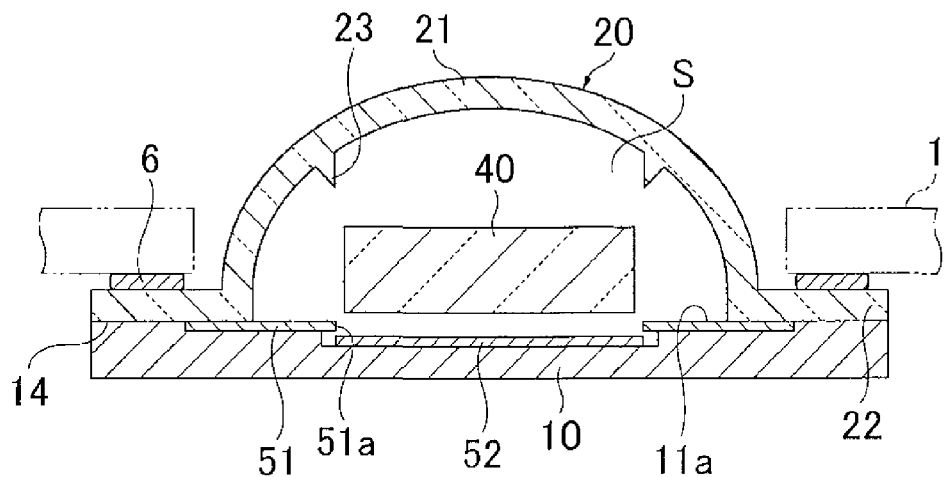
FIG. 3 is a sectional view of the vehicular lamp taken along line of FIG. 1.

FIG. 3 is a sectional view of the side turn signal lamp 4 taken along line III-III of FIG. 1. As shown in FIG. 3, the outer cover 20 includes a design surface portion 21 that is formed so as to swell outward, and a flat surface portion 22 that extends sideways from the design surface portion 21. The flat surface portion 22 is provided so as to surround the entire periphery of the design surface portion 21. A back surface of the flat surface portion 22 is a flat curved surface that extends along the curved surface portion 11a of the lamp body 10, and is in contact with the stepped portion 14 of the lamp body 10. Furthermore, a front surface of the flat surface portion 22 faces the back surface of the housing 1.

A seal member 6 is provided between the flat surface portion 22 and the housing 1, and tightly closes or thoroughly eliminates a gap between the outer cover 20 and the housing 1. Due to this construction, no air passage is allowed between the side turn signal lamp 4 and the housing 1, and occurrence of wind noise is prevented. The seal member 6 adopted herein may be a sheet-shaped packing, a resin adhesive, etc.

Furthermore, a diffusion step (step portion) 23 is formed at positions on the back surface of the design surface portion 21 of the outer cover 20 that correspond to an external edge of the insertion hole 51a. The diffusion step 23 rimming the insertion hole 51a improves the design property of the side turn signal lamp 4. Furthermore, the diffusion step 23 prevents a section of the vapor deposition sheet 50 from being seen from outside through the insertion hole 51a, and therefore improves the appearance of the side turn signal lamp 4.

(Assembly Process)

Next, an assembly method for the side turn signal lamp 4 constructed as described above will be described with reference to FIGS. 4 and 5.

Figure 4:
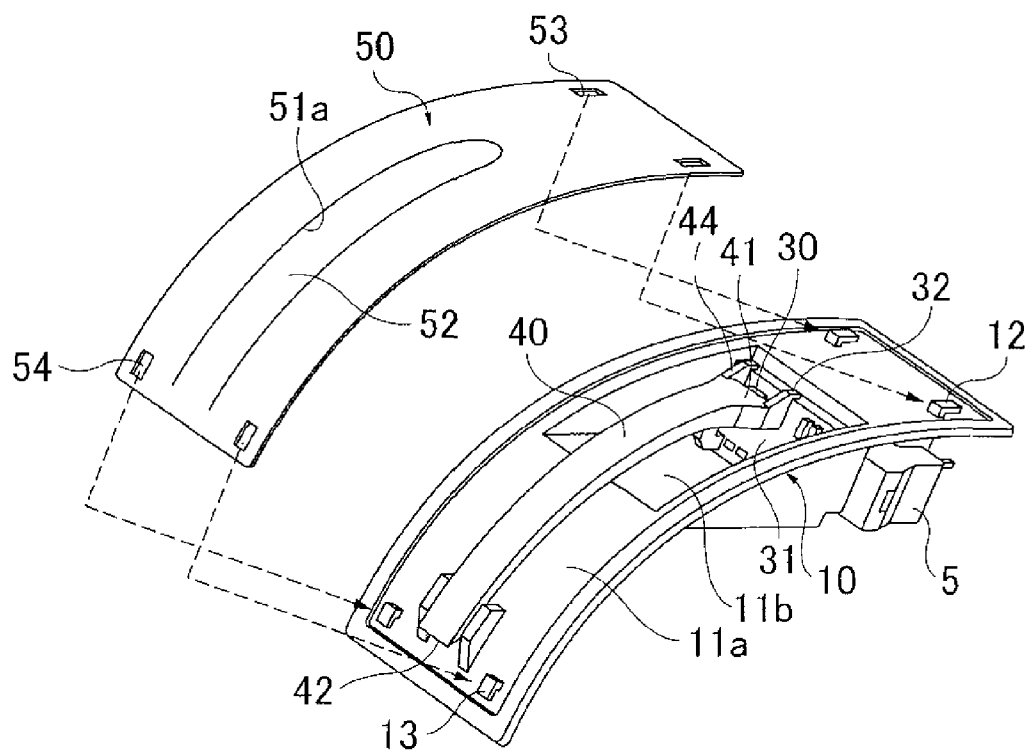
FIG. 4 is a diagram showing an assembly step for the vehicular lamp shown in FIG. 2.

As shown in FIG. 4, firstly the circuit board 31 carrying thereon the LED 30 and the electrode terminals 5 are attached to the lamp body 10. Furthermore, the inner lens 40 is attached to the circuit board 31 so that the light entrance surface 41 faces the LED 30. The attachment of these members is carried out by employing, for example, the fitting using a combination of a recess portion and a protrusion without using adhesive or the like. In the example shown in FIG. 4, the inner lens 40 is attached to the circuit board 31 by fitting lance portions 44 provided on the inner lens 40 near the light entrance surface 41 of the inner lens 40 into recess portions 32 provided in the circuit board 31.

Then, the vapor deposition sheet 50 is prepared. The vapor deposition sheet 50 provided with the insertion hole 51a and the first and second engagement holes 53 and 54 is formed by punching out a polycarbonate sheet that has been subjected to an aluminum vapor deposition process.

At this time, a vapor deposition sheet in which the insert portion 52 is integrated with the sheet body 51 can be obtained by making a cut in the vapor deposition sheet 50 so that a portion of the insertion hole 51a is left uncut. When the insertion hole 51a and the first and second engagement holes 53 and 54 are punched out, it is preferable to punch a blanking punch from the vapor deposition surface side to the side opposite the vapor deposition surface. By performing the punching in this manner, burr that may be formed at the time of punching is caused to be formed on the side opposite the vapor deposition surface that is invisible from outside. Incidentally, the vapor deposition sheet 50 is mounted so that the vapor deposition surface faces the outer cover 20 side and the surface opposite the vapor deposition surface faces the lamp body 10 side.

Next, the vapor deposition sheet 50 is attached to the lamp body 10. Firstly, the vapor deposition sheet 50 is brought closer to the lamp body 10 from the light exit surface 42 side, and then the insert portion 52 is inserted to the back side of the inner lens 40. Next, the first engagement holes 53 of the vapor deposition sheet 50 that are at a side remote from the light exit surface 42 are engaged with the first engaging projections 12 of the lamp body 10 by hooking the first engagement holes 53 on the corresponding first engaging projections 12. Furthermore, the vapor deposition sheet 50 is curved along the curved surface portion 11a of the lamp body 10. Furthermore, the second engagement holes 54 of the vapor deposition sheet 50 are engaged with the corresponding second engaging projections 13 while the vapor deposition sheet 50 is lightly pulled to the second engaging projection 13 side.

Thus, the vapor deposition sheet 50 is attached to the lamp body 10 while the vapor deposition sheet 50 is given tension and is curved. As a result of this, the flexible vapor deposition sheet 50 tends to restore an original shape from the curved state, and therefore restoration force acts on the vapor deposition sheet 50. However, against the restoration force, two opposite ends of the vapor deposition sheet 50 are stably supported by the first and second engaging projections 12 and 13 of the lamp body 10. Therefore, the vapor deposition sheet 50 is held in a shape that substantially conforms to the shape of the lamp body 10 and is tentatively fixed by the first and second engaging projections 12 and 13.

Furthermore, the inner lens 40 is inserted into the insertion hole 51a of the vapor deposition sheet 50, and the first engagement holes 53 provided in one side of the vapor deposition sheet 50 are engaged with the first engaging projections 12, which are formed closer to the outer cover 20 side than the LED 30 and the inner lens 40 are to the outer cover 20 side, and the second engagement holes 54 provided in the other side of the vapor deposition sheet 50 are engaged with the second engaging projections 13, which are formed closer to the lamp body 10 side than the inner lens 40 is to the lamp body 10 side. Due to this construction, the LED 30 is positioned between the vapor deposition sheet 50 and the lamp body 10, and the light exit surface 42 is positioned between the vapor deposition sheet 50 and the outer cover 20. Hence, the light exit surface 42 of the inner lens 40 is exposed to the outside, so that the function as the side turn signal lamp 4 is realized. Simultaneously, the LED 30 is shielded from outside by the vapor deposition sheet 50, so that the design property of the side turn signal lamp 4 can be improved.

Figure 5:
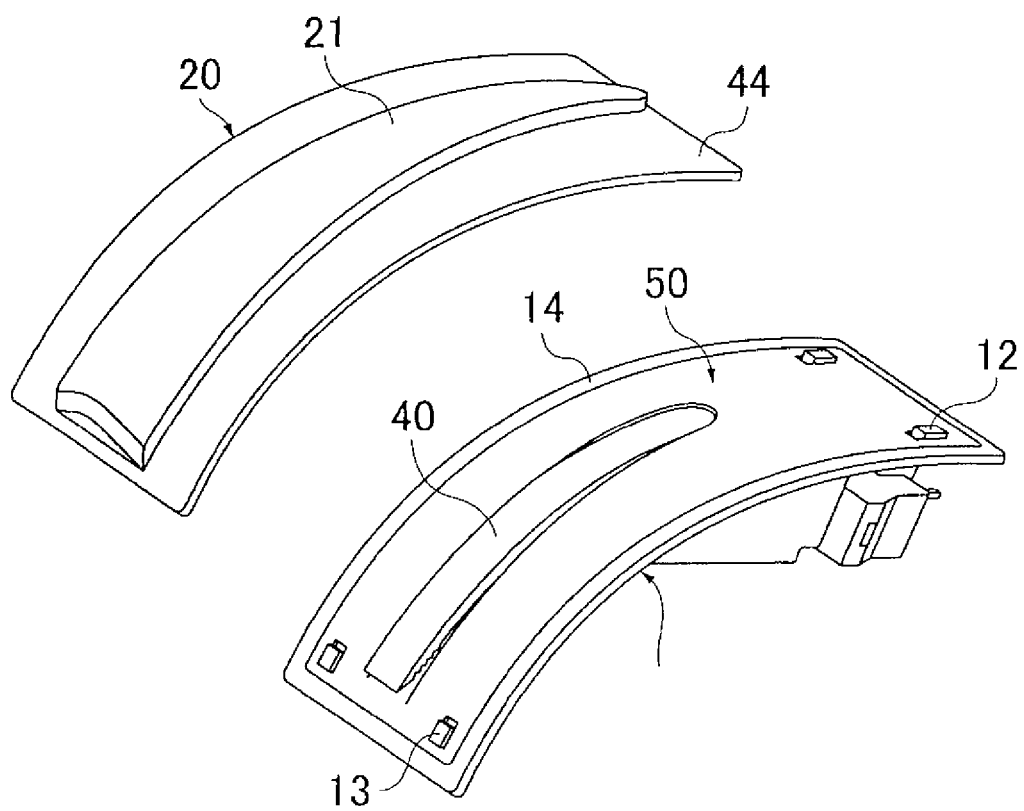
FIG. 5 is a diagram showing an assembly step for the vehicular lamp shown in FIG. 2.

Next, as shown in FIG. 5, the outer cover 20 is attached to the lamp body 10 so that inner lens 40 is covered with the design surface portion 21. At this time, since the protrusion height of the stepped portion 14 is set substantially equal to the thickness of the vapor deposition sheet 50, the flat surface portion 22 of the outer cover 20 contacts the stepped portion 14 of the lamp body 10 and also contacts the vapor deposition sheet 50. Therefore, as shown in FIG. 3, the vapor deposition sheet 50 is sandwiched in a surface contact fashion between the flat surface portion 22 of the outer cover 20 and the curved surface portion 11a of the lamp body 10. Thus, by sandwiching the vapor deposition sheet 50 between surfaces, the tentatively fixed vapor deposition sheet 50 is more securely fixed between the lamp body 10 and the outer cover 20.

In this embodiment, in order to secure areas of contact between the vapor deposition sheet 50, the lamp body 10 and the outer cover 20, substantially the entire surface of the inner wall of the lamp body 10, except the light source housing portion 11b, is formed as the curved surface portion 11a that substantially conforms to the shape of the outer cover 20 (see FIG. 4). Due to this, the vapor deposition sheet 50 can be more firmly fixed.

Thus, according to the vehicular lamp in accordance with the embodiment, a small-size side turn signal lamp 4 with a small dimension in the thickness direction can be provided by adopting the thin vapor deposition sheet 50 without adopting a thick-walled extension member.

Furthermore, due to the engagement between the first and second engaging projections 12 and 13 and the first and second engagement holes 53 and 54, the vapor deposition sheet 50 is held in a state in which the vapor deposition sheet 50 extends along the lamp body 10. Therefore, the outer cover 20 can be directly attached to the lamp body 10 without a need to tentatively fix the vapor deposition sheet 50 to the lamp body 10 through the use of a double sided tape or the like. Hence, since the use of a costly adhesive or the like is not needed, a small-size side turn signal lamp 4 can be provided at low cost, and the assembly efficiency can be improved.

Furthermore, since the LED 30, the inner lens 40 and the like are also assembled without using adhesive, the whole side turn signal lamp 4 can be constructed without using adhesive. Therefore, the side turn signal lamp 4 can be provided at further reduced cost.

Furthermore, since the insert portion 52 is formed integrally with the sheet body 51, there is no need to mount the insert portion 52 and the sheet body 51 separately. Therefore, attaching the vapor deposition sheet 50 to the lamp body 10 is easy. Still further, since the insert portion 52 and the first and second engagement holes 53 and 54 are formed by a punching-out process, the vapor deposition sheet 50 can be processed at low cost.

Furthermore, according to the embodiment, the insert portion 52 is formed by cutting so that a light exit surface 42-side portion of the insert portion 52 is left uncut, and the insert portion 52 is inserted from the light exit surface 42 side when the vapor deposition sheet 50 is attached to the lamp body 10. Therefore, the vapor deposition sheet 50 can easily be attached to the lamp body 10 so that the insert portion 52 is disposed on the lamp body 10-side of the inner lens 40 and so that an opposite portion of the vapor deposition sheet 50 to the insert portion 52 is disposed at the outer cover 20-side of the inner lens 40 so as to shield the LED 30.

Incidentally, the invention is not limited to the foregoing embodiment, but can be variously modified, improved, etc. as appropriate. Furthermore, the materials, shapes, dimensions, numerical values, configurations, numbers, locations of disposal or installation, etc. of the component elements of the embodiment described above are not limited but arbitrary as long as they allow the invention to be accomplished.

For example, the vapor deposition sheet 50 may be attached to the outer cover 20, and the outer cover 20 with the vapor deposition sheet 50 attached thereto may be attached to the lamp body 10 to assemble the side turn signal lamp 4. In this case, engaging projections are formed on the outer cover 20.

Furthermore, the shapes of the first and second engaging projections 13 and 14 and the first and second engagement holes 53 and 54 are not limited by the foregoing embodiment. For example, the engagement holes may be formed by cutting out from the vapor deposition sheet 50, or may also be formed to have a slit shape.

Furthermore, the engaging projections may simply be provided in such a shape as to be protruded from the lamp body 10 to the outer cover 20 side. Furthermore, although in the foregoing embodiment, the two first engaging projections are provided at two separate locations, it is also permissible to provide one first projection that extends in the width direction. Still further, one first engaging projection and one second engaging projection may be provided in corner portions of the vapor deposition sheet 50 that are diagonally opposite to each other. This arrangement also allows the vapor deposition sheet 50 to be tentatively fixed in a stable manner.

Furthermore, although in the foregoing embodiment, the side turn signal lamp 4 is constructed so that light from the LED 30 is sent out rearward relative to the vehicle through the inner lens 40, the invention is not limited to this example construction. For example, there may be adopted a construction in which the inner lens 40 is omitted and a light exit surface of the LED 30 is exposed rearward through the insertion hole 51a of the vapor deposition sheet 50. Due to this construction, light from the LED 30 can be directly emitted to the outside. This construction will provide the side turn signal lamp 4 at low cost.

Furthermore, the light source is not limited to the LED 30. It is naturally possible to adopt as the light source a known light source, such as a discharge lamp bulb, a halogen bulb, etc. Still further, in the case, for example, where an inner wall of the lamp body 10 is provided with coating or painting, the insert portion 52 of the vapor deposition sheet 50 may be omitted.

For example, the reflection portion 43 does not need to be provided. Since light from the LED 30 is entirely sent out rearward relative to the vehicle, the visibility of the side turn signal lamp 4 from the rear of the vehicle can be improved.

Furthermore, a vapor deposition sheet 50 that has simply been subjected to the aluminum vapor deposition without any further process may be adopted, or the aluminum vapor deposited surface may be coated or painted to change the color or color shade of the vapor deposition surface. Still further, the design property may be improved by performing engraving in various manners. Due to the adoption of the vapor deposition sheet 50 that allows its external appearance to be easily changed by color shade, engraving or the like, it becomes easy to follow changes in the design of the vehicular lamp.

Furthermore, although in the foregoing embodiment, the invention is applied to a side turn signal lamp, the invention is not limited to such an application. For example, the invention can also be applied to a vehicular head lamp, a vehicular indication lamp, a vehicular cabin lamp, etc.

The lamp body and the outer cover may have a surface presser portion that clamps the vapor deposition sheet.

The light emission portion may have a light source, and a light guide equipped with a light exit surface that sends out light coming in from the light source, and the vapor deposition sheet may be provided with an insertion opening portion into which the liquid guide is inserted, and the vapor deposition sheet may be held so that the light source is positioned between the vapor deposition sheet and the lamp body and so that the light exit surface is positioned between the vapor deposition sheet and the outer cover.

The vapor deposition sheet may include a sheet body that is provided with the insertion opening portion, and an insert portion that is formed integrally with the sheet body and that is inserted between the light guide and the lamp body.

The outer cover may be provided with a step portion that is provided at a position that corresponds to the external edge of the insertion opening portion.

What is claimed is:

1. A vehicular lamp comprising:
a lamp body having an opening portion;
an outer cover that closes the opening portion and that, together with the lamp body, forms a lamp chamber between the outer cover and the lamp body;
a light emission portion disposed within the lamp chamber;
a vapor deposition sheet that is disposed within the lamp chamber and that covers the lamp body with at least a portion of the light emission portion exposed; and
an engaging portion that at least one of the outer cover and the lamp body has and that is adapted to engage with the vapor deposition sheet and hold the vapor deposition sheet in a curved shape that substantially conforms to the outer cover or the lamp body, wherein
the vapor deposition sheet includes an engaged portion that engages with the engaging portion;
the at least one of the outer cover and the lamp body has a curved shape, and
the vapor deposition sheet is a flexible sheet that is held in a curved shape that substantially conforms to the curved shape of the at least one of the outer cover and the lamp body.

2. The vehicular lamp according to claim 1, wherein:
the vapor deposition sheet has an elongated shape;
the engaged portion of the vapor deposition sheet includes holes that are formed at least in two end portions of the vapor deposition sheet in a lengthwise direction of the vapor deposition sheet; and
the engaging portion includes engaging projections that are provided integrally with at least one of the outer cover and the lamp body, at positions that correspond to the holes, and that are each formed so as to engage with an edge portion of a corresponding one of the holes.

3. The vehicular lamp according to claim 1, wherein the lamp body and the outer cover have a surface presser portion that clamps the vapor deposition sheet.

4. The vehicular lamp according to claim 1, wherein:
the light emission portion includes a light source and a light guide that is provided with a light exit surface that sends out light that comes in from the light source;
the vapor deposition sheet has an insertion opening portion, into which the light guide is inserted; and
the vapor deposition sheet is held so that the light source is positioned between the vapor deposition sheet and the lamp body and so that the light exit surface is positioned between the vapor deposition sheet and the outer cover.

5. The vehicular lamp according to claim 4, wherein the vapor deposition sheet includes a sheet body provided with the insertion opening portion, and an insert portion that is formed integrally with the sheet body and that is inserted between the light guide and the lamp body.

6. The vehicular lamp according to claim 4, wherein the light guide is provided with an optical element that reflects or refracts at least part of light that comes in from the light source, into a reflection or refraction direction that is different from a light guiding direction of the light guide.

7. The vehicular lamp according to claim 6, wherein the optical element is a reflection portion provided on a rear surface of the light guide near the light exit surface of the light guide, the light exit surface being positioned at an end portion of the light guide that is opposite a side of the light guide, on which light from the light source enters.

8. The vehicular lamp according to claim 4, wherein the outer cover has a step portion at a position that corresponds to an external edge of the insertion opening portion.

9. A vehicular lamp comprising:

a lamp body having an opening portion;

an outer cover that closes the opening portion and that, together with the lamp body, forms a lamp chamber between the outer cover and the lamp body;

a light emission portion disposed within the lamp chamber;

a vapor deposition sheet that is disposed within the lamp chamber and that covers the lamp body with at least a portion of the light emission portion exposed; and an engaging portion that at least one of the outer cover and the lamp body has and that is adapted to engage with the vapor deposition sheet and hold the vapor deposition sheet in a curved shape that substantially conforms to the outer cover or the lamp body, wherein the vapor deposition sheet includes an engaged portion that engages with the engaging portion;

the light emission portion includes a light source and a light guide that is provided with a light exit surface that sends out light that comes in from the light source;

the vapor deposition sheet has an insertion opening portion, into which the light guide is inserted;

the vapor deposition sheet is held so that the light source is positioned between the vapor deposition sheet and the lamp body and so that the light exit surface is positioned between the vapor deposition sheet and the outer cover; and the outer cover has a step portion at a position that corresponds to an external edge of the insertion opening portion.

* * * * *